United States Patent [19]

D'Amato et al.

[11] Patent Number: 4,620,218

[45] Date of Patent: Oct. 28, 1986

[54] METHOD OF TRANSMITTING AND RECEIVING COLOR TELEVISION SIGNALS ON TWO CHANNELS FOR BROADCASTING FROM SATELLITE AND APPARATUS FOR CARRYING OUT SAID METHOD

[75] Inventors: Paolo D'Amato; Rolando Salvadorini, both of Turin, Italy

[73] Assignee: Rai-Radio Televisione Italiana, Rome, Italy

[21] Appl. No.: 510,284

[22] Filed: Jul. 1, 1983

[30] Foreign Application Priority Data

Jul. 7, 1982 [IT] Italy ............................... 22276 A/82

[51] Int. Cl.⁴ .............................................. H04N 9/36
[52] U.S. Cl. ....................................................... 358/12
[58] Field of Search .......................................... 358/12

[56] References Cited

U.S. PATENT DOCUMENTS

| | | | |
|---|---|---|---|
| 4,127,865 | 11/1978 | Poetsch | 358/12 |
| 4,485,401 | 11/1984 | Tan et al. | 358/12 |
| 4,510,520 | 4/1985 | Parker et al. | 358/12 |
| 4,520,385 | 5/1985 | Jackson et al. | 358/12 |

OTHER PUBLICATIONS

Takashi Fujio et al, High-Definition Television Systems-Signal Standard and Transmission, SMPTE Journal, vol. 89, Aug. 1980, pp. 579-584.

*Primary Examiner*—John W. Shepperd

*Attorney, Agent, or Firm*—Amster, Rothstein & Ebenstein

[57] ABSTRACT

In order to improve the quality of color television signals for broadcasting via satellite, the signals are transmitted on two of the channels available for transmission via satellite according to the rules established by CCIR. In the case of transmission by means of a compatible system, the NTSC, PAL or SECAM signal is transmitted on the first of the two channels and on the second channel there are transmitted the baseband R-Y and B-Y signals at from 0 to about 3 MHz sequentially on alternate lines and up to the limit of the video band the high frequency components of the luminance signal. In the case of transmission by means of a non-compatible system, there is transmitted on the first channel the luminance information in the whole available band and on the second channel the chrominance information R-Y and B-Y in the whole available band according to the following two alternatives: (1) the information is transmitted by means of a time division multiplex in which the first half of the active line is transmitted in one of the chrominance components and the second half in the other component; (2) the information is transmitted by means of a frequency sharing multiplex in which one of the components is transmitted in baseband, i.e. from 0 to about 3 MHz, and the other component is transmitted on an amplitude modulated subcarrier with single side band or vestigial band.

2 Claims, 6 Drawing Figures

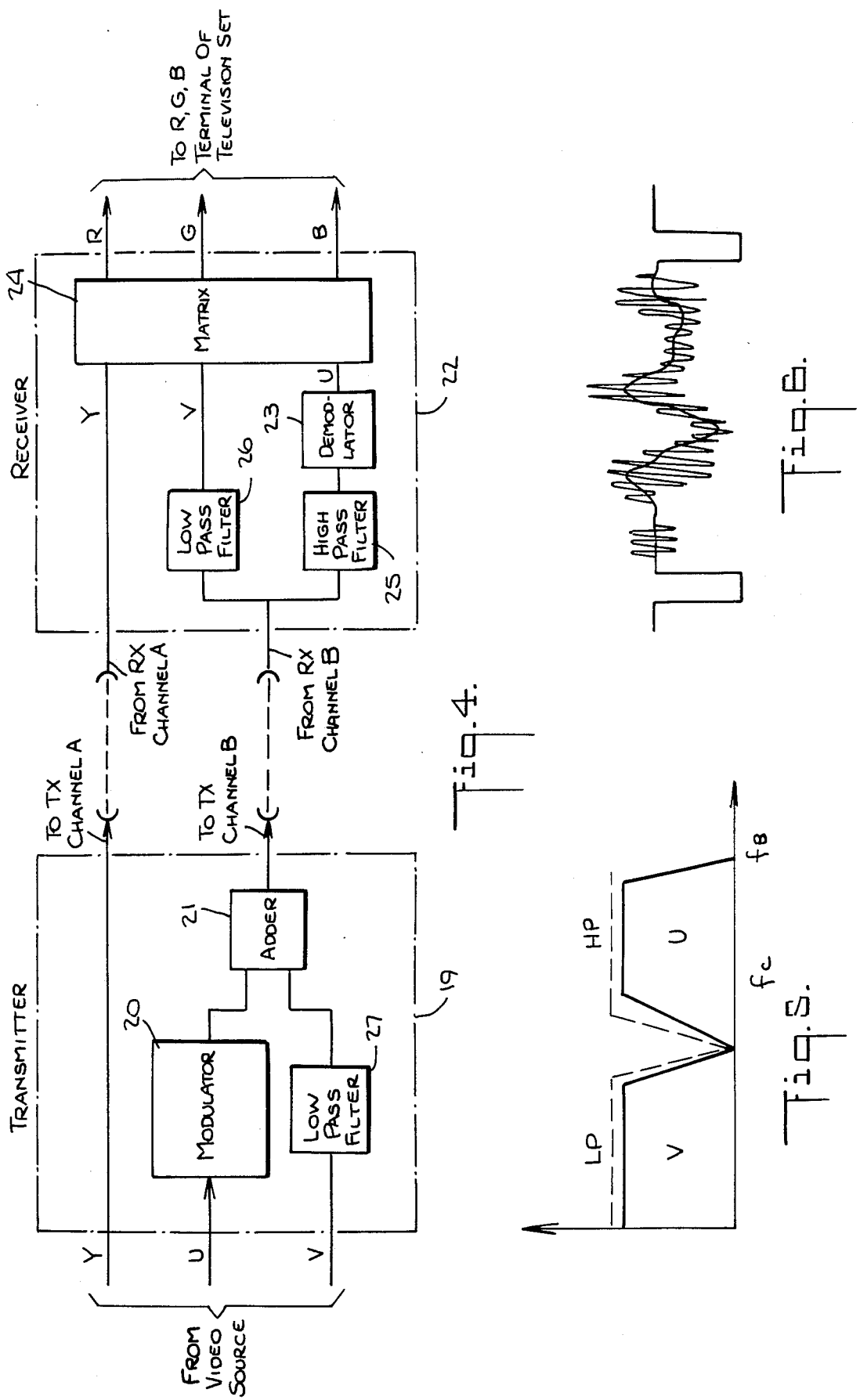

METHOD OF TRANSMITTING AND RECEIVING COLOR TELEVISION SIGNALS ON TWO CHANNELS FOR BROADCASTING FROM SATELLITE AND APPARATUS FOR CARRYING OUT SAID METHOD

The present invention relates to the transmission and reception of color television signals.

It is well known that by present color television transmission methods it is not possible to offer the user a television signal which is free of cross-color and cross-luminance defects due to interlacing of luminance and chrominance spectra. This is due to the fact that at present color television signals are transmitted on a single channel and any attempt to eliminate said defects would bring on such complications as to discourage any approach in this sense. The difficulty could be overcome by subdividing the color television signal in two channels, but this would involve the requirement of modifying present television standards with all the complications which would result therefrom.

These considerations apply, however only to transmissions of color television signals in the normal earth network.

For direct broadcasting from satellite, which is a new service which has not yet been adopted in any European country, it is possible to imagine different standards provided they are compatible with the standard rules established by WARC-77. One of these rules is that the interferences produced by the new signal on other channels must not be higher than those produced by a normal NTSC, PAL or SECAM signal. It is easily understood that once these rules are met, broadcasting from satellite, which makes possible transmission on a plurality of channels, makes it possible to furnish users with a signal having a higher quality than present signals.

It is an object of the present invention to provide a method of transmitting color television signals for broadcasting from satellite comprising the steps of transmitting the television signal on two channels in different manners according to whether the system involved is compatible or non-compatible.

The difference between the two systems is that in the compatible system a normal NTSC, PAL or SECAM signal is transmitted on the first channel so that said signal can be received by normal television sets which cannot, however, receive the improved signal which is transmitted on two channels. In the non-compatible system, instead no complete NTSC, PAL or SECAM signal is transmitted on any of the two channels so that no signal is received by a normal television set unless a standard converter outside the television set is used.

More particularly, the method of transmitting color television signals for broadcasting from satellite according to the invention is characterized in that when a compatible system is used, it comprises the steps of transmitting on a first channel the complete color television signal and on a second channel the baseband chrominance R-Y and B-Y signals from 0 to about 3 MHz sequentially on alternate lines and from 3 MHz up to the limit of the video band the high frequency components of the luminance signal.

In the case of a non-compatible system, the method of transmitting color television signals on two channels according to the invention is characterized in that it comprises the steps of transmitting the luminance information in the whole available band on a first channel and the R-Y and B-Y chrominance information in the whole available band on a second channel.

It is a further object of the invention to provide an apparatus for carrying out the method.

The invention will be better understood from the following detailed description, given merely by way of example and therefore not in a limiting sense, of some embodiments thereof with reference to the accompanying drawings in which:

FIG. 4 is a block diagram of a non-compatible apparatus according to the invention with frequency sharing multiplex in the second channel;

FIG. 5 is a graph of the spectrum of the signal supplied to the TX channel B of the apparatus of FIG. 4; and FIG. 6 is a graph of the video signal appearing in the TX channel B of the apparatus of FIG. 4.

Figure 1:
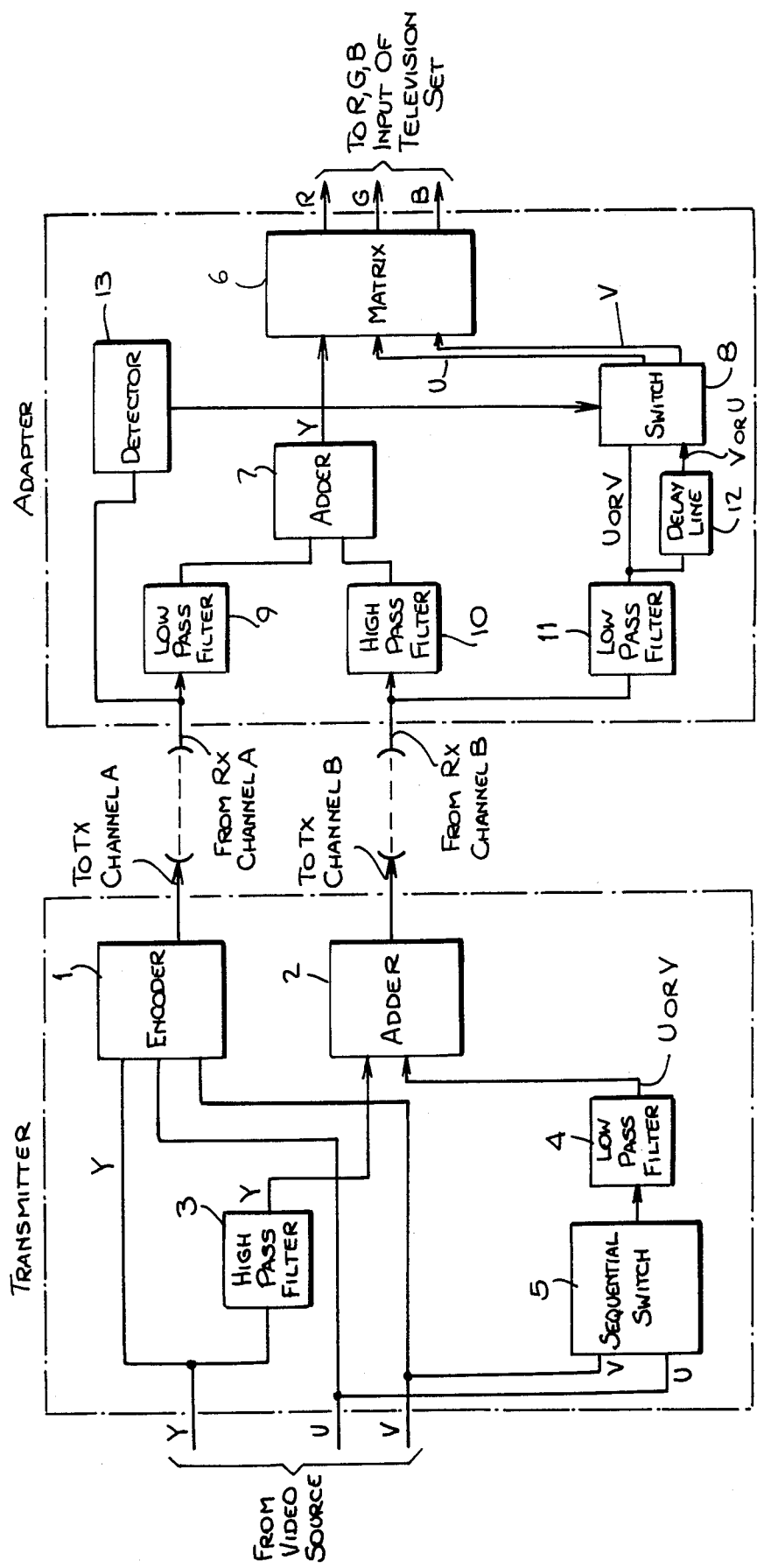
FIG. 1 is a block diagram of a compatible apparatus according to the invention.

Referring first to FIG. 1, part of the transmitter of the compatible system is depicted which comprises an encoder (NTSC, PAL or SECAM) 1 having three inputs for applying thereto the three Y, U and V signals and an output connected to a first channel A of the transmitter. The transmitter comprises also an adder 2 having two inputs one of which is connected to the output of a high pass filter 3 having the Y signal applied to its input, whereas the other input is connected to the output of a low pass filter 4 having its input connected to the output of a sequential switch 5 having two inputs for applying thereto the U and V signals. The output of the adder 2 is connected to a second channel B of the transmitter.

The signal appearing on channel A is a normal NTSC, PAL or SECAM signal suitable for normal television sets. Therefore, for a normal television set, the VHF or UHF vestigial band modulated signal can be sent directly to the antenna terminal of the television set. Those who desire to receive the improved quality signal must provide a special adapter capable of using both transmitted signals (that on channel A and that on channel B). This adapter can be connected to a television set provided with a low frequency R, G, B input.

The adapter comprises a matrix 6 having three inputs, one of which is connected to the output of an adder 7 whereas the other two are each connected to an output of a switch 8. The adder 7 has two inputs, one of which is connected to the output of a low pass filter 9 having the signal received by the adapter on channel A applied to its input, whereas the other is connected to the output of a high pass filter 10 having the signal received by the adapter on channel B applied to its input. The switch 8 has two inputs, one of which is connected directly to the output of a low pass filter 11 having the signal received by the adapter on channel B applied to its input, whereas the other is connected to said output of the filter 11 through a delay line 12. The adapter comprises also a detector 13 of the NTSC, PAL or SECAM alternance having the signal received on channel A applied to its input and having its output connected to a third input of the switch 8. The matrix 6 has three outputs connected to the inputs R, G, B of the television set.

The above-described apparatus operates as follows:

On channel A there is transmitted the NTSC, PAL or SECAM SIGNAL. On channel B there are transmitted at from 0 to 3 MHz the baseband R-X and B-Y signals sequentially on alternate lines and from 3 MHz up to about the limit of the available band in the channel the high frequency components of the luminance signal which are present on channel A but are not usable because they are mixed with the chrominance signal.

The adapter according to the invention receives the luminance components from 0 to about 3 MHz from channel A and those from 3 MHz and up from channel B and receives in addition the chrominance components from channel B. In this manner the cross-color and cross-luminance defects are eliminated which are due to the interlacing of the luminance and chrominance spectra present either with NTSC, SECAM or PAL.

It is in addition possible, if channel B permits it, to transmit luminance components having a higher frequency than the nominal limit of the video band.

In an apparatus made according to the diagram of FIG. 1 the high pass filter 3 has a cut-off frequency $f_T \cong 3.5$ MHz, the low pass filter 4 has $f_T \cong 3$ MHz, the complementary high pass and low pass filters 10 and 9 respectively have $f_T \cong 3.8$ MHz and the low pass filter 11 has $f_T \cong 3.2$ MHz and the delay of the delay line 12 is 64 μs.

The video signal on channel B is of a conventional type, with exception of the line blanking at 0.35 V, inasmuch as U and V have a zero average value. The Y, U and V signals were conventional PAL signals, i.e.:

$$Y = 0.30 E_R' + 0.59 E_V' + 0.11 E_B'$$

$$U = k_U(E_B' - E_Y') \text{ with } k_U = 0.493$$

$$V = k_V(E_R' - E_Y') \text{ with } k_V = 0.877$$

The values of the $k_U$ and $k_V$ coefficients can be changed without departing from the scope of the invention.

$E_R'$, $E_V'$ and $E_B'$ are the γ corrected R, G and B signals respectively.

The delay line 12, since it must operate in baseband, must be made with CCD (charge-coupled devices) techniques.

In the described apparatus, the sequential switch 5 of the transmitter selects, on alternate lines, U or V. The switch 8 of the receiver exchanges the inputs with one another at a line frequency such that U and V always appear at the output. The correct switching phase is derived from the NTSC, PAL or SECAM alternance, or from the vertical synchronism.

Figure 2:
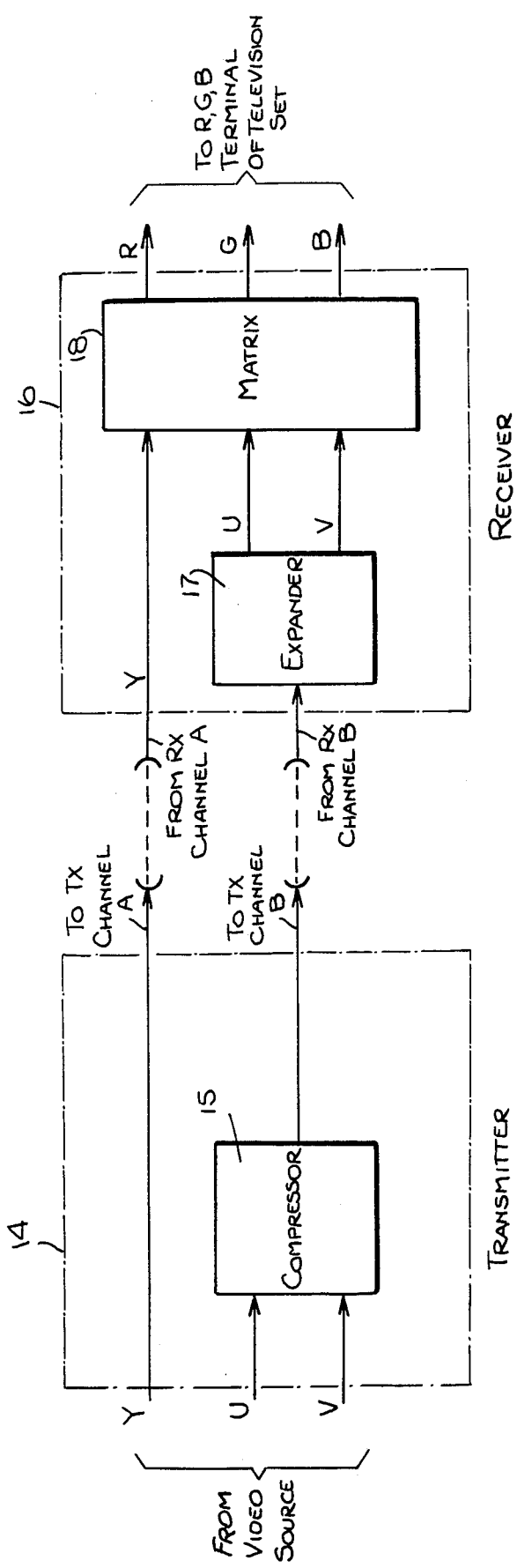
FIG. 2 is a block diagram of a non-compatible apparatus according to the invention with time division in the second channel.

Referring now to the description of the apparatus embodying the non-compatible system, in FIG. 2 is shown a non-compatible apparatus with time division multiplex on channel B. This apparatus is provided for the transmission on channel A of the luminance information in the whole available band and the transmission on channel B of the chrominance (R-Y B-Y) information in the whole available band (by available band it is meant the portion not occupied by audio subcarriers) by a time division multiplex, i.e. one of the two chrominance components is transmitted in the first half of the active line and the other component in the second half.

Referring to FIG. 2, transmitter 14 comprises a compressor 15, and receiver 16 comprises an expander 17 whose two outputs are connected to two inputs of a matrix 18.

Figure 3:
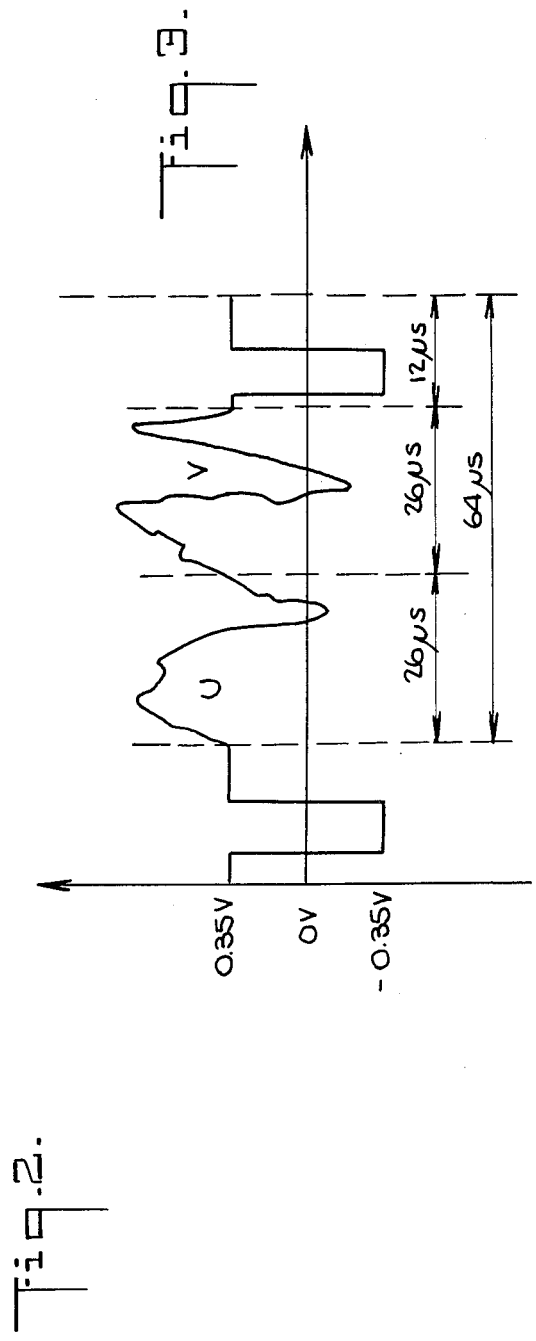
FIG. 3 is a graph of a signal generated in the apparatus of FIG. 2.

The compressor 15 generates the signal shown in FIG. 3.

In the 52 μs forming the "active" portion of the line there are present the signals U and V (or V and U) time compressed with a ratio 1:2. Synchronism is that of a normal black and white video signal but, like in the case of the compatible apparatus of FIG. 1, the line blanking is shifted to the "grey" level (0.35 V) inasmuch as the U and V signals are at a zero average value. The Y, U and V signals are those conventional for PAL already considered with reference to FIG. 1.

In both channels the shape of the synchronizing signals can be changed. In particular there can be inserted audio channels PCM transmitted with the well known "Sound-in-Syncs" system, or the duration of the line blanking (which in FIG. 3 is 12 μs) can be reduced in order to suitably increase the duration of the active portion of the line, thus widening the size of the image, which is particularly useful for large screen vision, inasmuch as a width-height ratio higher than the present (4/3) is subjectively appreciated more.

Because of the non-compatible character of the system being discussed, it is also possible to increase the number of scanning lines in order to improve the vertical definition, and by reducing proportionally the horizontal definition without departing from the scope of the invention.

In FIG. 4 an apparatus is shown providing the non-compatible version of the proposed system with frequency sharing multiplex in channel B. This apparatus provides for transmission on channel A of the luminance information in the whole available band (like the apparatus of FIG. 2) and for transmission on channel B of the chrominance (R-Y, B-Y) information in the whole available band by means of a frequency sharing multiplex, i.e. one of the chrominance components is transmitted in baseband, i.e. from 0 to about 3 MHz (preferably the R-Y component inasmuch as it is influenced more by noise) and the other component is transmitted on an amplitude modulated or single lateral (higher) band or vestigial band subcarrier when less complex modulators and demodulators are desired at the cost of non-optimal use of the available spectrum.

Referring to FIG. 4, transmitter 19 comprises a modulator 20 having its output connected to an input of an adder 21 which has its second input connected to the output of a low pass filter 27 which limits the spectrum of the baseband transmitted component, and receiver 22 comprises a demodulator 23 having its output connected to a matrix 24 and its input connected to the output of a high pass filter 25 which has, in turn, its input connected to the receiving apparatus of channel B to which also the input of a low pass filter 26 is connected having its output connected to a second input of the matrix 24.

In the case of transmission on vestigial band subcarrier, the spectrum of the signal going to the TX channel B is that shown in FIG. 5.

The value of the U modulated subcarrier depends on the band $f_B$ available in channel B and the type of modulation (side band or vestigial). For example with $f_B = 8$ and vestigial band modulation, the subcarrier $f_C$ can be located in the area of 4.8–5 MHz.

The video signal is shown in FIG. 6.

Like in the preceding cases, synchronism is of the conventional type, but line blanking is raised to 0.35 V inasmuch as the V signal is at a zero average value. A frequency burst $f_C$ is present, situated in the same position as the conventional PAL burst. The phase of this burst is constant and equal to that of the subcarrier $f_C$. In demodulation, the burst is used to rebuild the subcarrier $f_C$ supplied to a conventional synchronous demodulator.

In the receiver 22, the low pass filter 26 and the high pass filter 25, whose response curves are diagrammatically shown in dotted lines in FIG. 5, are used for separating U and V.

While but some embodiments of the invention have been illustrated and described, it is obvious that a number of changes and modifications can be made without departing from the scope of the invention.

We claim:

1. A compatible method of transmitting color television signals on two channels for broadcasting from satellite, comprising the steps of transmitting on a first channel the complete color television signal and on a second channel the baseband chrominance R-Y and B-Y signals at from 0 to about 3 MHz sequentially on alternate lines, and from 3 MHz up to the limit of the video band the high frequency components of the luminance signal.

2. An apparatus for transmitting and receiving color television signals on two channels, comprising a transmitter and a receiver, the transmitter comprising means for transmitting the complete color television signal on a first channel and U and V television signals on a second channel, an NTSC, PAL or SECAM encoder, an adder, a high pass filter, a low pass filter and a switch, the encoder having three inputs for coupling thereto of the three television signals Y, U and V and an output coupled to the first channel of the transmitting apparatus for transmitting the complete color television signal, the adder having two inputs, one of which is coupled to the output of the high pass filter and the other of which is coupled via the low pass filter to the output of the sequential switch, the high pass filter having an input for coupling thereto of the Y television signal, the sequential switch having two inputs for coupling thereto of the V and U television signals, the adder being coupled to the second channel of the apparatus for transmitting the baseband chrominance R-Y and B-Y signals at from 0 to about 3 MHz sequentially on alternate lines, and from 3 MHz up to the limit of the video band the high frequency components of the luminance signal, the receiver including first and second channel inputs and comprising a matrix, an adder, a switch, two low pass filters, a high pass filter, a delay line and a detector, the matrix having three inputs, one of which is coupled to the output of the adder and the other two of which are each coupled to respective outputs of the switch, the adder having two inputs, one of which is coupled to the output of a first low pass filter and the other of which is coupled to the output of the high pass filter, the first low pass filter and the high pass filter having respective inputs coupled to the first and second channel inputs, respectively, the switch having three inputs, a first of which is coupled to the output of a second low pass filter and a second of which is coupled to said output of the second low pass filter through the delay line, the second low pass filter having its input coupled to the second channel input, the detector being a NTSC, PAL or SECAM alternance detector having its input coupled to the first channel input and having its output coupled to a third input of the switch.

* * * * *